United States Patent
Diekmann et al.

(10) Patent No.: US 11,130,478 B2
(45) Date of Patent: Sep. 28, 2021

(54) METHOD AND DEVICE FOR CONTROLLING LONGITUDINAL DYNAMICS IN A MOTOR VEHICLE DURING AN AUTONOMOUS DRIVING OPERATION

(71) Applicant: Robert Bosch GmbH, Stuttgart (DE)

(72) Inventors: Christoph Diekmann, Besigheim (DE); Alfred Strehle, Fellbach (DE); Thomas Schmidt, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 256 days.

(21) Appl. No.: 16/304,799

(22) PCT Filed: Mar. 31, 2017

(86) PCT No.: PCT/EP2017/057748
§ 371 (c)(1),
(2) Date: Nov. 27, 2018

(87) PCT Pub. No.: WO2017/207133
PCT Pub. Date: Dec. 7, 2017

(65) Prior Publication Data
US 2020/0317173 A1 Oct. 8, 2020

(30) Foreign Application Priority Data

Jun. 2, 2016 (DE) .......................... 102016209733.4

(51) Int. Cl.
*B60T 8/176* (2006.01)
*B60T 7/12* (2006.01)
(Continued)

(52) U.S. Cl.
CPC ................ *B60T 8/176* (2013.01); *B60T 7/12* (2013.01); *B60T 8/17636* (2013.01);
(Continued)

(58) Field of Classification Search
CPC ........ B60T 8/176; B60T 7/12; B60T 8/17636; B60T 17/22; B60T 2201/02;
(Continued)

(56) References Cited

U.S. PATENT DOCUMENTS 5,382,086 A * 1/1995 Tuck ................... B60T 8/17636
303/156
8,538,674 B2 * 9/2013 Breuer ............... B60K 31/0008
701/301

(Continued)

FOREIGN PATENT DOCUMENTS

CN 103079917 A 5/2013
DE 102006060905 A1 6/2008
(Continued)

OTHER PUBLICATIONS

International Search Report for PCT/EP2017/057748, dated Jun. 8, 2017.

*Primary Examiner* — Adam R Mott
*Assistant Examiner* — Hana Lee
(74) *Attorney, Agent, or Firm* — Norton Rose Fulbright US LLP; Gerard Messina

(57) ABSTRACT

A method for controlling longitudinal dynamics in a motor vehicle during an autonomous driving operation, where the presence of a front vehicle traveling ahead of the vehicle is ascertained with the aid of a surround sensor system; ascertaining at least one longitudinal dynamics variable of the front vehicle, which describes the longitudinal vehicle dynamics of the front vehicle, with the aid of the surround sensor system; and ascertaining at least one variable, which is used in a brake control system of the motor vehicle, as a function of the longitudinal dynamics variable of the front vehicle.

12 Claims, 3 Drawing Sheets

(51) Int. Cl.
*B60T 8/1763* (2006.01)
*B60T 17/22* (2006.01)

(52) U.S. Cl.
CPC ............ *B60T 17/22* (2013.01); *B60T 2201/02* (2013.01); *B60T 2210/12* (2013.01); *B60T 2210/32* (2013.01); *B60T 2270/10* (2013.01); *B60T 2270/402* (2013.01)

(58) Field of Classification Search
CPC ............ B60T 2210/12; B60T 2210/32; B60T 2270/10; B60T 2270/402
See application file for complete search history.

(56) References Cited

U.S. PATENT DOCUMENTS

| | | | |
|---|---|---|---|
| 2008/0189040 A1* | 8/2008 | Nasu | G08G 1/163 701/301 |
| 2012/0022760 A1* | 1/2012 | Kato | B60T 8/1766 701/70 |
| 2013/0116909 A1* | 5/2013 | Shida | B60K 31/00 701/96 |
| 2014/0032049 A1* | 1/2014 | Moshchuk | G08G 1/166 701/42 |
| 2015/0210280 A1* | 7/2015 | Agnew | B60W 30/095 701/48 |
| 2016/0114779 A1* | 4/2016 | Binder | B60T 13/686 701/76 |
| 2017/0158225 A1* | 6/2017 | Brown | G05D 1/0088 |

FOREIGN PATENT DOCUMENTS

| | | |
|---|---|---|
| DE | 102012203182 A1 | 9/2012 |
| DE | 102011116112 A1 | 4/2013 |
| DE | 102013007857 A1 | 11/2014 |
| DE | 102014209015 A1 | 11/2015 |
| EP | 1344672 A1 | 9/2003 |
| JP | H05330412 A | 12/1993 |
| JP | H0769201 A | 3/1995 |
| JP | 2012035818 A | 2/2012 |
| JP | 2012038258 A | 2/2012 |
| WO | 2012020297 A1 | 2/2012 |

* cited by examiner

METHOD AND DEVICE FOR CONTROLLING LONGITUDINAL DYNAMICS IN A MOTOR VEHICLE DURING AN AUTONOMOUS DRIVING OPERATION

CROSS-REFERENCE TO RELATED APPLICATIONS

The present application is the national stage of International Pat. App. No. PCT/EP2017/057748 filed Mar. 31, 2017, and claims priority under 35 U.S.C. § 119 to DE 10 2016 209 733.4, filed in Germany on Jun. 2, 2016, the content of each of which are incorporated herein by reference in their entireties.

FIELD OF THE INVENTION

The present invention relates to a method and device for controlling longitudinal dynamics in a motor vehicle during an autonomous driving operation.

BACKGROUND INFORMATION

Patent document DE 10 2014 209 015 A1 discusses a method of controlling distance for a vehicle, the vehicle including an image acquisition device and a surround sensor system, the surround sensor system supplying an environmental signal, which represents a positional information item and/or a speed information item for at least one vehicle traveling ahead, the method including a step of inputting an image information item of the image acquisition device, a step of ascertaining at least one environmental information item, using the image information item, as well as a step of defining a distance control signal, using the environmental signal, and using the environmental information item, in order to implement distance control for the vehicle.

SUMMARY OF THE INVENTION

The present invention relates to a method for controlling longitudinal dynamics in a motor vehicle during an autonomous driving operation, where the presence of a front vehicle traveling ahead of the vehicle is ascertained with the aid of a surround sensor system;

at least one longitudinal dynamics variable of the front vehicle, which describes the longitudinal vehicle dynamics of the front vehicle, is ascertained with the aid of the surround sensor system; and at least one variable, which is used in a brake control system of the motor vehicle, is ascertained as a function of the longitudinal dynamics variable of the front vehicle.

By evaluating the operating dynamics of a vehicle traveling ahead, a brake control system is provided data for optimizing its braking actions. These additional data are important, in particular, if the brake control system is a secondary system, which is only used in response to a malfunction or defect of the primary system and its sensor signals and must ensure at least reliable emergency braking.

One advantageous refinement of the present invention is characterized in that the longitudinal dynamics variable of the front vehicle is the longitudinal deceleration of the front vehicle. Thus, this variable is particularly important, since it relates to the longitudinal dynamics of the vehicle crucial to braking actions.

One advantageous refinement of the present invention is characterized in that the at least one variable used in the brake control system of the motor vehicle is a limiting value of a longitudinal deceleration for the longitudinal deceleration of the motor vehicle achievable without locking the wheels; and that with the aid of the brake control system, an intervention in the longitudinal dynamics of the motor vehicle, independent of the driver, is carried out in such a manner, that the limiting value of the longitudinal deceleration is not exceeded. This refinement is based on the assumption that the motor vehicle may be decelerated at least just as sharply as a vehicle traveling ahead. In this manner, the execution of safe emergency braking is rendered possible.

One advantageous refinement of the present invention is characterized in that a braking torque acting on the wheels of the motor vehicle is built up at a first rate of increase, until the deceleration of the motor vehicle reaches the ascertained limiting longitudinal deceleration value; and that the braking torque is subsequently built up further at a second rate of increase, the second rate of increase being less than the first rate of increase. Without knowledge of the roadway coefficient of friction, a deceleration stronger than that of the front vehicle is associated with an increased risk of locking wheels. Therefore, upon reaching the limiting longitudinal deceleration value, only a slower build-up of braking force should take place.

One advantageous refinement of the present invention is characterized in that the action carried out by the brake control system, independently of the driver, is braking resulting in a dead stop of the vehicle. Consequently, in the case of a vehicle traveling in an autonomous or automated manner, the driver gains time to assume control over the vehicle.

One advantageous refinement of the present invention is characterized in that the brake control system of the motor vehicle is a secondary brake system, which is provided for emergency operation and is activated if a brake control system provided for the normal operation of the motor vehicle malfunctions.

One advantageous refinement of the present invention is characterized in that the secondary brake control system is a one-channel system. Consequently, the most important functionality is already ensured at a low cost.

One advantageous refinement of the present invention is characterized in that the surround sensor system is a video or radar sensor system. Such sensor systems are already prevalent in a number of modern vehicles.

One advantageous refinement of the present invention is characterized in that the surround sensor system is a sensor system, which receives information wirelessly from the vehicle traveling ahead, about its current vehicle deceleration or its current position. In this context, the vehicle position may be ascertained, in particular, using a GPS system. In this case, the GPS position of the vehicle traveling ahead may be used in the determination of its vehicle deceleration. In this instance, the communication with the vehicle traveling ahead may take the form of, in particular, car-2-car communication, but may also run over a central computer.

One advantageous refinement of the present invention is characterized in that the surround sensor system is a sensor system for determining the temporal change in the distance to the vehicle traveling ahead.

One advantageous refinement of the present invention is characterized in that the at least one variable used in the brake control system of the motor vehicle is a minimum value of the coefficient of friction of the roadway section traveled on by the front vehicle at the time of its determination.

In addition, the present invention includes a device, which contains devices that are configured to implement the method of the present invention. In this context, it is, in particular, a control unit, in which program code for executing the method of the present invention is stored.

DETAILED DESCRIPTION

Figure 1:
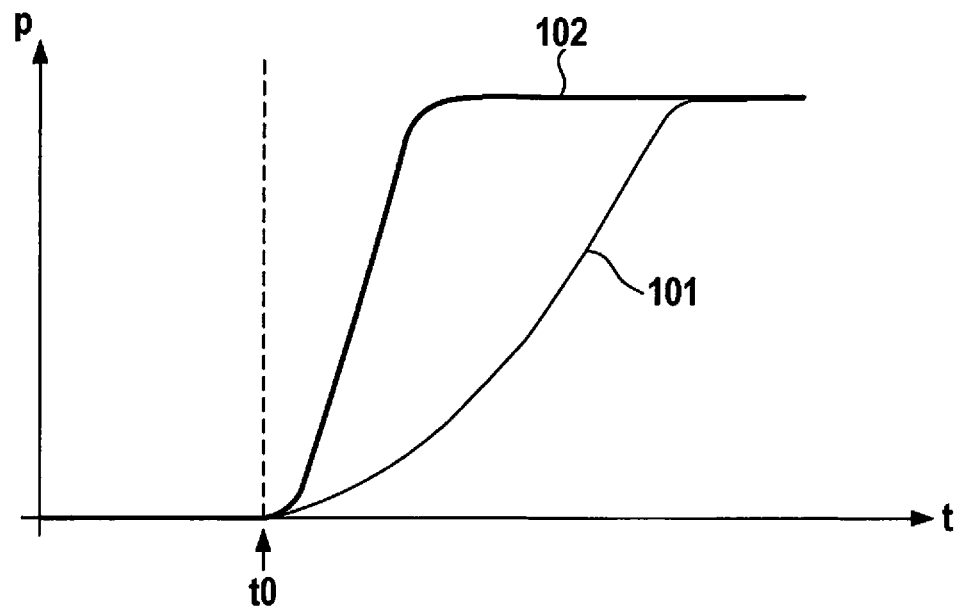
FIG. 1 shows the build-up of brake pressure as a function of time, at a high, existing coefficient of friction, with and without a vehicle traveling ahead.

In the area of automated, highly automated and partially automated driving of a motor vehicle, during normal operation, vehicle stabilization may be implemented by a device for active and passive brake pressure modulation at individual wheels, such as a vehicle dynamics control system, together with the corresponding actuators. This system provided for the normal case is referred to as the primary actuator system.

In the case of a malfunction of the primary actuator system, it is necessary for a secondary stabilizing actuator system or secondary actuator system to be available, which allows at least longitudinal stabilization of the motor vehicle. In this context, the following requirements are made of the secondary actuator system:

compliance with the order of locking must be ensured; that is, the rear axle wheels may only lock, if the wheels of the front axle are already locked;

the locking period of wheels may not exceed a predetermined temporal period, in order to ensure the ability of the motor vehicle to be steered; and there must be an option of building up pressure actively and/or independently of the driver, in order to decelerate the vehicle in an automated manner.

During vehicle operation with a functional primary actuator system, information about the coefficient of friction of the road surface is available in some driving situations. In these driving situations, the coefficient of friction is ascertained from wheel speed data and further sensor information, which are associated with the primary actuator system.

For safety reasons, it is recommended that the sensor data of the primary actuator system not be used for the secondary actuator system, for in the event of a malfunction of the primary actuator system, its sensor data may be missing or erroneous. However, in the event of a malfunction of the primary actuator system and a hand-over to the secondary actuator system, this results initially in no ascertained coefficient of friction of the road surface being available.

In this connection, however, there is a limitation: Since the secondary actuator system must ensure at least longitudinal stabilization of the vehicle, the output signal of a longitudinal acceleration sensor not integrated in the primary actuator system must be available, for example, to the secondary actuator system. To that end, e.g., the secondary actuator system may access the longitudinal acceleration sensor used in the scope of an air bag control system, or a longitudinal acceleration sensor, which is shared with the primary actuator system, but whose signal processing does not take place in the primary actuator system, which means that this sensor is even available in the case of their failure. Alternatively, it is also possible to use information of wheel speed sensing elements in the secondary actuator system, if the signal acquisition and evaluation of the wheel speed sensing elements is not integrated in the primary actuator system, that is, if reliable wheel speed information is available even in the case of a malfunction of the primary actuating system.

In addition to the missing coefficient of friction, the variables describing the wheel states, such as the wheel speeds, are also not available in the case of a hand-over to the secondary actuator system. However, with the aid of a surround sensor system, it is possible to estimate a minimum value of a vehicle deceleration capable of being generated by braking actions of the secondary actuator system, without having to use current wheel speeds.

Using the longitudinal deceleration of a vehicle traveling ahead, which is ascertained with the aid of a surround sensor system, a minimum value or limiting value of the attainable deceleration of the ego vehicle may be estimated, and the build-up of brake pressure and the increase in vehicle deceleration by the secondary actuator system may occur as a function of that. In particular, the braking force may be increased very rapidly by the secondary actuator system, until the ascertained minimum value of the deceleration is reached. A further advantage of this is that due to the rapid, active increase in deceleration, the distance to the vehicle traveling ahead is decreased as little as possible.

In FIG. 1, time t is plotted in the abscissa direction and brake pressure p is plotted in the ordinate direction for the case of a hydraulic brake system. However, the present invention is obviously suited for pneumatic or electric brake systems, as well. At time t0, a deceleration request to the vehicle is made, which is out of the ordinary for the primary actuator system. This deceleration request may have been generated by the driver via the accelerator pedal, as well as independently of the driver, e.g., by an automatic emergency braking function. If no vehicle traveling ahead is detected by the surround sensor system, then, due to the missing wheel speed information, a rather slower build-up of brake pressure takes place, in order to always prevent the wheels from locking. Therefore, the increase in deceleration takes place at a lower rate, since for the one-channel longitudinal stabilization by the secondary actuator system, the vehicle performance acknowledgement variables, such as the longitudinal acceleration, are available in a less finely resolved form than, e.g., the wheel speed sensing element information. In addition, e.g., in the case of signal transmission in the vehicle via data bus systems, time delays may occur. In order to prevent relatively long instances of instability of the wheels and unintentional wheel slip, the braking force is then increased only relatively slowly.

This is represented with the aid of curve 101. However, if a vehicle traveling ahead is detected, which exhibits a high vehicle deceleration, then it may be concluded that the ego vehicle may also be decelerated sharply. Thus, a rapid build-up of brake pressure may take place in accordance with curve 102.

Figure 2:
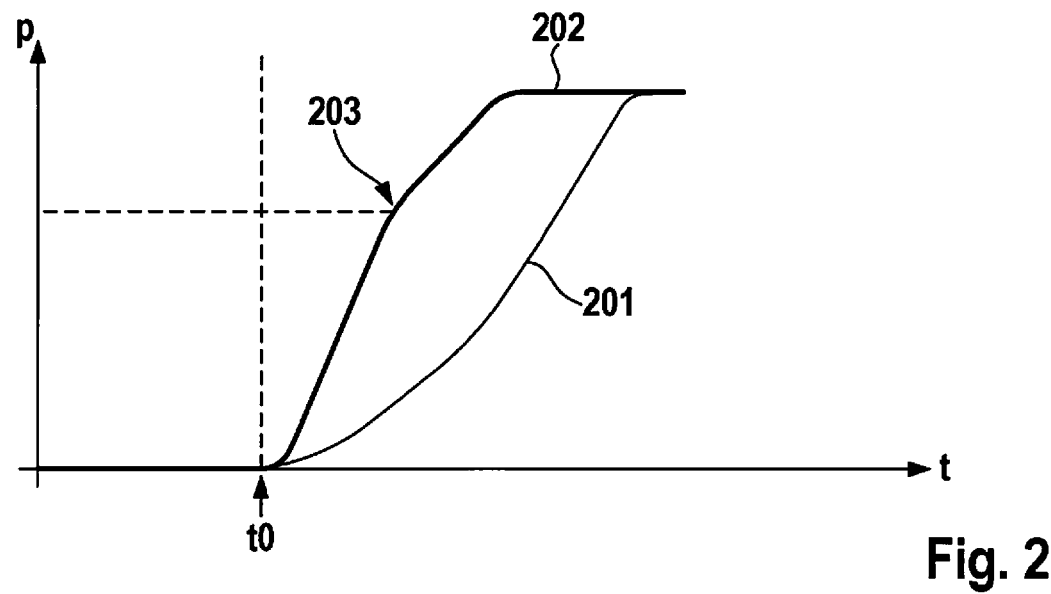
FIG. 2 shows the build-up of brake pressure as a function of time, with and without a vehicle traveling ahead, the vehicle traveling ahead braking more lightly than in FIG. 1.

In FIG. 2, as well, time t is plotted in the abscissa direction and brake pressure p is plotted in the ordinate direction, in a manner analogous to FIG. 1. At time t0, a deceleration request to the vehicle is made again, which is out of the ordinary for the primary actuator system. Again, in a manner analogous to FIG. 1, reference numeral 201 indicates the cautious build-up of brake pressure by the secondary actuator system, if no vehicle traveling ahead is present. Reference numeral 202 indicates the build-up of brake pressure in response to the presence of a vehicle traveling ahead. The vehicle traveling ahead has a deceleration less than in the case considered in FIG. 1. Therefore, the initial build-up of brake pressure proceeds more slowly than in FIG. 1. At the point designated by 203, the deceleration of the vehicle reaches that of the vehicle traveling ahead. A further build-up of brake pressure must now take place more slowly, in order to prevent the wheels from locking.

Figure 3:
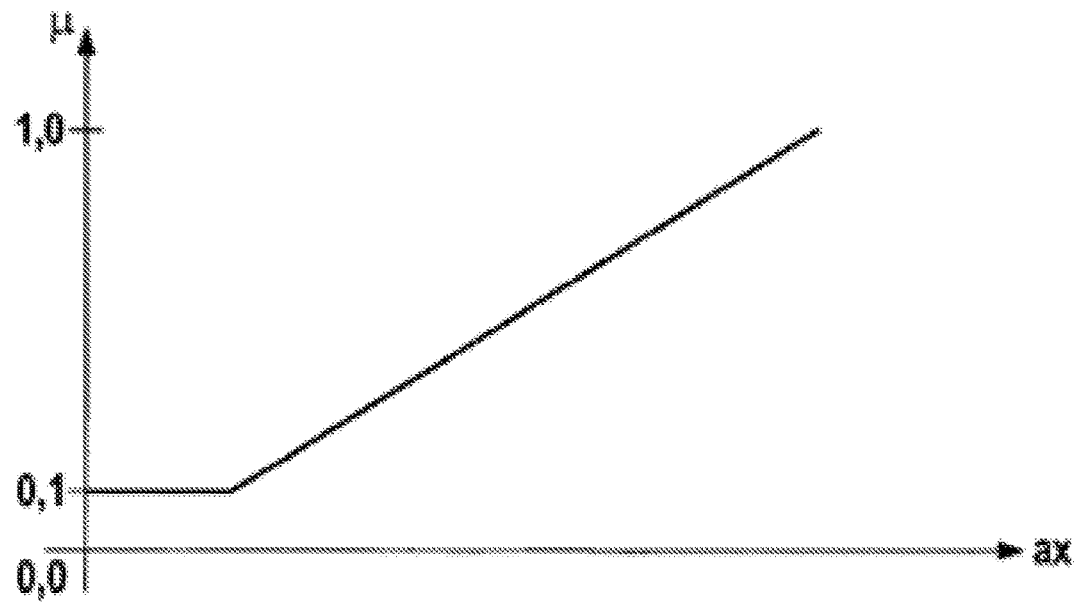
FIG. 3 shows an estimated or assumed coefficient of friction as a function of the deceleration of a vehicle traveling ahead, which is ascertained with the aid of a surround sensor system.

In FIG. 3, longitudinal vehicle deceleration ax of the vehicle traveling ahead is represented in the abscissa direction, and a minimum value of the coefficient of friction of the road surface is represented in the ordinate direction. This simple characteristic curve may be used, e.g., in order to deduce a coefficient of friction of the road surface from deceleration ax of the vehicle traveling ahead, which is ascertained with the aid of the surround sensor system.

Figure 4:
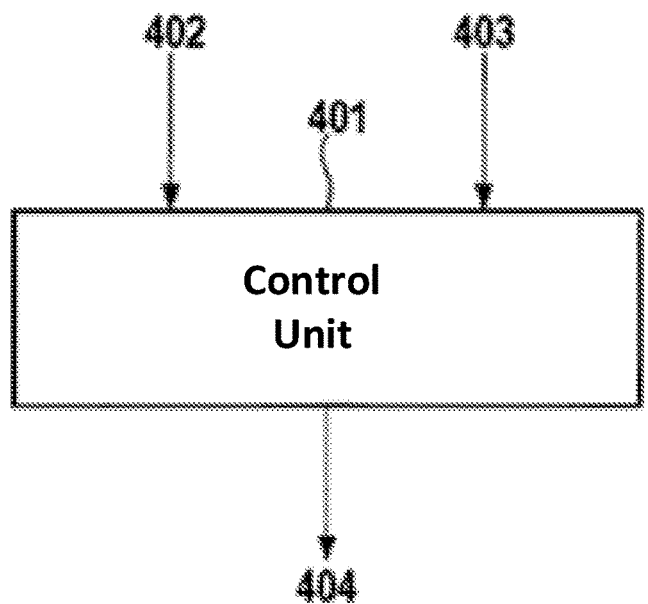
FIG. 4 shows a block diagram including the input and output variables for the longitudinal stabilization of the vehicle.

Input and output variables of the present invention are represented illustratively in FIG. 4. Block 401 denotes the control unit of the secondary actuator system, which is used in response to a malfunction of the primary actuator system. In the case of the input variables, reference numeral 402 denotes the longitudinal vehicle information ascertained, in particular, by a longitudinal acceleration sensor, and reference numeral 403 denotes the deceleration information of a vehicle traveling ahead, which is ascertained with the aid of a surround sensor system. In the block, target pressure 404, which is used for the pressure modulation, is ascertained as a function of these. In this case, it is, in particular, one-channel pressure modulation, since the secondary actuator system is only configured for longitudinal stabilization and not for lateral stabilization of the vehicle.

Figure 5:
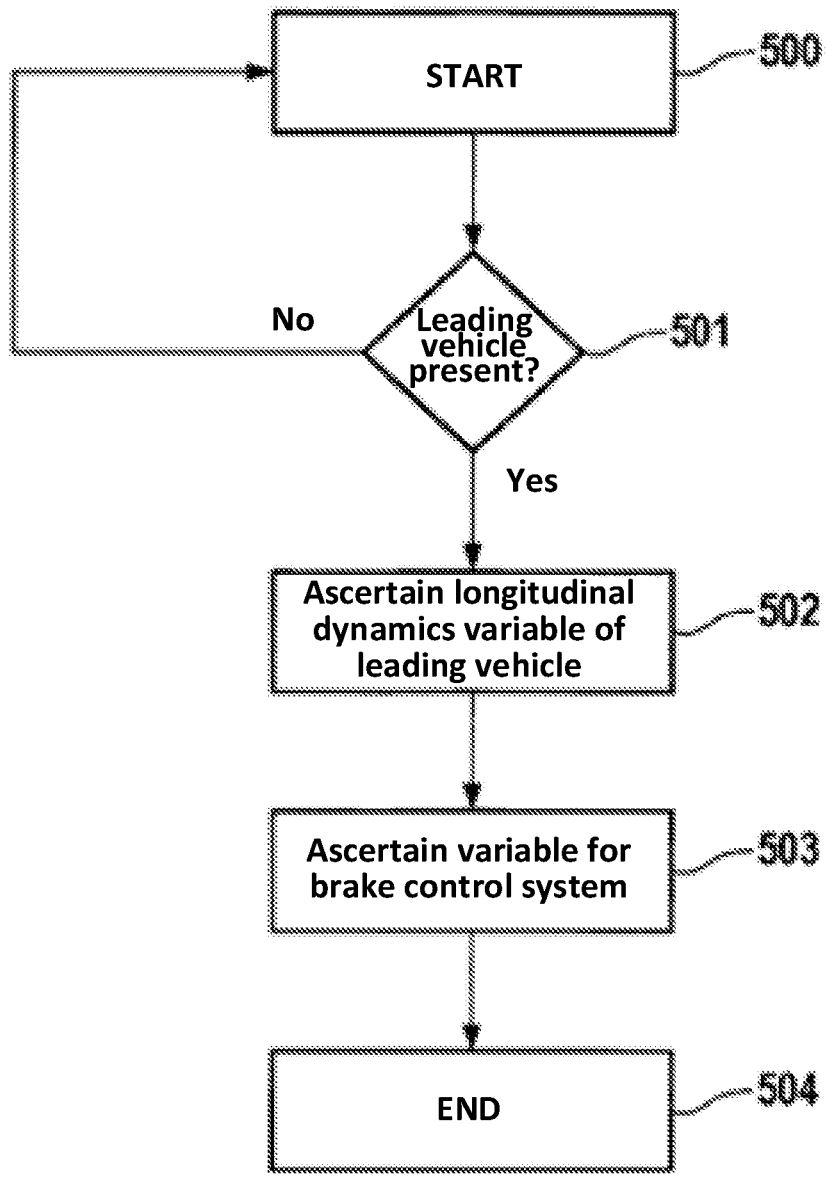
FIG. 5 shows the basic operating sequence of the method according to the present invention.

The basic operating sequence of the method according to the present invention is represented in FIG. 5. After the start of the method in block 500, in block 501, it is checked by a surround sensor system, if a vehicle traveling ahead is located in front of the vehicle. If this is not the case, then the method returns to block 500. However, if this is the case, then at least one longitudinal dynamics variable of the front vehicle, which describes the longitudinal dynamics of the front vehicle, is subsequently ascertained in block 502. Then, in block 503, at least one variable, which is used in a brake control system of the motor vehicle, is ascertained as a function of the longitudinal dynamics variable of the front vehicle. The method ends in block 504.

What is claimed is:

1. A method for controlling a motor vehicle, the method comprising:
    ascertaining a presence of a front vehicle traveling ahead of the motor vehicle with the aid of a surround sensor system;
    ascertaining information regarding a deceleration of the front vehicle;
    based on the ascertained information regarding the deceleration of the front vehicle ascertaining an initial deceleration value of the motor vehicle; and
    in response to a setting of a target braking value of the motor vehicle, which requires an increase of braking torque of the motor vehicle, and in accordance with the ascertained initial deceleration value:
        initiating the increase of the braking torque to increase a deceleration of the motor vehicle towards the ascertained initial deceleration value; and
        during the increase of the braking torque that has been initiated, in response to the deceleration of the motor vehicle reaching the ascertained initial deceleration value prior to the target braking value being reached, lowering a rate of the building up of the braking torque so that the increase of the brake torque that had been initiated continues to thereby increase the deceleration of the motor vehicle beyond the ascertained initial deceleration value, but at the lower rate.

2. The method of claim 1, wherein the ascertained initial deceleration value is a value of the deceleration that is assumed to be performable without locking wheels of the motor vehicle.

3. The method of claim 1, wherein the increase of the braking torque results in a dead stop of the motor vehicle.

4. The method of claim 1, wherein the increase of the braking torque in accordance with the ascertained initial deceleration value is performed using a secondary brake control system, which is provided for an emergency operation and is activated if a brake control system provided for the normal operation of the motor vehicle malfunctions, and the brake control system provided for the normal operation of the motor vehicle, when not malfunctioning, is configured to perform the increase of the braking torque based on the target braking value and an ascertained roadway coefficient of friction without the ascertained initial deceleration value, the roadway coefficient of friction not being ascertainable by the secondary brake control system.

5. The method of claim 4, wherein the secondary brake control system is a one-channel system.

6. The method of claim 1, wherein the surround sensor system is a video or radar sensor system.

7. The method of claim 1, wherein the surround sensor system is a sensor system, which receives information wirelessly from the vehicle traveling ahead, about its current vehicle deceleration or its current position.

8. The method of claim 1, wherein the surround sensor system is a sensor system for determining a temporal change in a distance to the vehicle traveling ahead.

9. The method of claim 1, wherein the ascertained initial deceleration value of the motor vehicle is set based on a minimum value of a coefficient of friction of a roadway section traveled on by the front vehicle determined based on the information regarding the deceleration of the front vehicle.

10. The method of claim 1, wherein the increase of the braking torque performed in response to the setting of the target braking value is performed during an autonomous driving operation of the motor vehicle.

11. A device for controlling a motor vehicle, the device comprising:
    a controller configured for performing the following:
        ascertaining a presence of a front vehicle traveling ahead of the motor vehicle with the aid of a surround sensor system;
        ascertaining information regarding a deceleration of the front vehicle;
        based on the ascertained information regarding the deceleration of the front vehicle ascertaining an initial deceleration value of the motor vehicle; and in response to a setting of a target braking value of the motor vehicle, which requires an increase of braking torque of the motor vehicle, and in accordance with the ascertained initial deceleration value:
- initiating the increase of the braking torque to increase a deceleration of the motor vehicle towards the ascertained initial deceleration value; and
- during the increase of the braking torque that has been initiated, in response to the deceleration of the motor vehicle reaching the ascertained deceleration value prior to the target braking value being reached, lowering a rate of the building up of the braking torque so that the increase of the brake torque that had been initiated continues to thereby increase the deceleration of the motor vehicle beyond the ascertained initial deceleration value, but at the lower rate.

12. The device of claim 11, wherein the increase of the braking torque performed in response to the setting of the target braking value is performed during an autonomous driving operation of the motor vehicle.

* * * * *